United States Patent
Kim et al.

(10) Patent No.: US 10,326,483 B2
(45) Date of Patent: Jun. 18, 2019

(54) METHOD AND DEVICE FOR REMOVING SELF-INTERFERENCE SIGNAL IN ENVIRONMENT USING FDR MODE

(71) Applicant: LG ELECTRONICS INC., Seoul (KR)

(72) Inventors: Dongkyu Kim, Seoul (KR); Hyunsoo Ko, Seoul (KR); Jaehoon Chung, Seoul (KR); Kukheon Choi, Seoul (KR); Kwangseok Noh, Seoul (KR); Sangrim Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/545,515

(22) PCT Filed: Oct. 21, 2015

(86) PCT No.: PCT/KR2015/011133
§ 371 (c)(1),
(2) Date: Jul. 21, 2017

(87) PCT Pub. No.: WO2016/117801
PCT Pub. Date: Jul. 28, 2016

(65) Prior Publication Data
US 2018/0013466 A1    Jan. 11, 2018

Related U.S. Application Data

(60) Provisional application No. 62/106,797, filed on Jan. 23, 2015.

(51) Int. Cl.
*H04B 1/44* (2006.01)
*H04B 1/12* (2006.01)
(Continued)

(52) U.S. Cl.
CPC ............ *H04B 1/12* (2013.01); *H04B 1/525* (2013.01); *H04B 7/0857* (2013.01); *H04B 15/02* (2013.01);
(Continued)

(58) Field of Classification Search
CPC .... H04B 1/0475; H04B 1/525; H04B 17/345; H04B 15/00; H04B 1/1027; H04B 1/12;
(Continued)

(56) References Cited

U.S. PATENT DOCUMENTS

2009/0262852 A1* 10/2009 Orlik .................. H04L 1/0606
375/267
2010/0011269 A1* 1/2010 Budianu ............. H04L 1/1812
714/748
(Continued)

FOREIGN PATENT DOCUMENTS

| KR | 1020100117308 | 11/2010 |
| WO | 2014074677 | 5/2014 |
| WO | 2015009084 | 1/2015 |

OTHER PUBLICATIONS

PCT International Application No. PCT/KR2015/011141, Written Opinion of the International Searching Authority dated Feb. 24, 2016, 16 pages.
(Continued)

*Primary Examiner* — Ajibola A Akinyemi
(74) *Attorney, Agent, or Firm* — Lee Hong Degerman Kang Waimey (57) ABSTRACT

A method for removing a self-interference signal by a device supporting an FDR mode can further comprise the steps of: transmitting a signal to a counterpart node in a predetermined time interval; generating, in an RF stage of the device, a residual self-interference signal after removal of an analog self-interference signal with respect to the signal and then
(Continued)

storing same; and receiving from the counterpart node a NACK signal with respect to the transmission of the signal; retransmitting the signal to the counterpart node; and, if decoding of the signal which has been received in the predetermined time interval is successful, using only a part of the stored residual self-interference signal when removing a digital self-interference signal on the basis of the retransmission.

10 Claims, 10 Drawing Sheets

(51) Int. Cl.
    *H04B 15/02*     (2006.01)
    *H04B 1/525*     (2015.01)
    *H04B 7/08*     (2006.01)
    *H04L 5/14*     (2006.01)
    *H04B 17/14*     (2015.01)
    *H04B 1/56*     (2006.01)
    *H04L 5/00*     (2006.01)
    *H04B 17/345*     (2015.01)

(52) U.S. Cl.
    CPC .............. *H04L 5/14* (2013.01); *H04L 5/1461* (2013.01); *H04B 1/56* (2013.01); *H04B 17/14* (2015.01); *H04B 17/345* (2015.01); *H04L 5/0055* (2013.01)

(58) Field of Classification Search
    CPC ............ H04B 2001/0408; H04B 17/10; H04B 17/21; H04B 17/24; H04B 17/309
    USPC .......................................................... 455/78
    See application file for complete search history.

(56) References Cited

U.S. PATENT DOCUMENTS

| | | | |
|---|---|---|---|
| 2010/0232324 A1 | 9/2010 | Radunovic et al. | |
| 2011/0249569 A1 | 10/2011 | Mashino et al. | |
| 2012/0201173 A1* | 8/2012 | Jain ........................ | H04B 1/525 370/277 |
| 2013/0301487 A1* | 11/2013 | Khandani ............. | H04W 16/14 370/278 |
| 2014/0348018 A1 | 11/2014 | Bharadia et al. | |
| 2015/0139284 A1* | 5/2015 | Choi ....................... | H04L 5/143 375/219 |

OTHER PUBLICATIONS

PCT International Application No. PCT/KR2015/011133, Written Opinion of the International Searching Authority dated Mar. 15, 2016, 17 pages.
LG-Nortel, "Self Interference Considerations in Relay Node", 3GPP TSG RAN WG1 Meeting #56, R1-091078, Feb. 2009, 2 pages.
LG Electronics, "Issues in Signal Transmissions and Receptions in D2D Operations", 3GPP TSG RAN WG1 Meeting #74, R1-133389, August 2013, 6 pages.
ALCATEL-Lucent, "Consideration of Resource Used and Power Setting for D2D Communication", 3GPP TSG RAN WG1 Meeting #73, R1-132069, May 2013, 4 pages.
Samsung, "Full duplex multiplexing of Un and Uu subframes", 3GPP TSG RAN WG1 Meeting #60, R1-101197, Feb. 2010, 3 pages.
U.S. Appl. No. 15/545,667, Notice of Allowance dated Feb. 14, 2019, 6 pages.

* cited by examiner

METHOD AND DEVICE FOR REMOVING SELF-INTERFERENCE SIGNAL IN ENVIRONMENT USING FDR MODE

CROSS-REFERENCE TO RELATED APPLICATIONS

This application is the National Stage filing under 35 U.S.C. 371 of International Application No. PCT/KR2015/011133, filed on Oct. 21, 2015, which claims the benefit of U.S. Provisional Application No. 62/106,797 filed on Jan. 23, 2015, the content of which are all hereby incorporated by reference herein their entirety.

TECHNICAL FIELD

The present invention relates to a wireless communication system, and more particularly, to a method for performing self-interference signal cancellation in an environment using an FDR scheme and device therefor.

BACKGROUND ART

Compared to conventional half duplex communication in which time or frequency resources are divided orthogonally, full duplex communication doubles a system capacity in theory by allowing a node to perform transmission and reception simultaneously.

Figure 1:
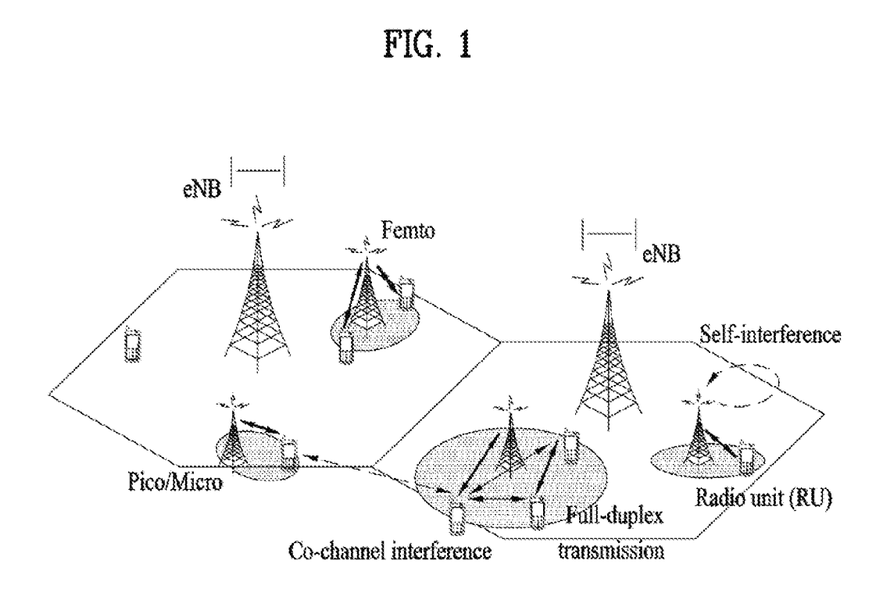
FIG. 1 is a diagram illustrating an exemplary network supporting full-duplex/half-duplex radio modes of a user equipment according to the present invention.

FIG. 1 is a conceptual view of a UE and a Base Station (BS) which support Full Duplex Radio (FDR).

In the FDR situation illustrated in FIG. 1, the following three types of interference are produced.

Intra-device Self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-link Interference: An Uplink (UL) signal transmitted by a UE is received at an adjacent UE and thus serves as interference.

BS to BS Inter-link Interference: The BS to BS inter-link interference refers to interference caused by signals that are transmitted between BSs or heterogeneous BSs (pico, femto, and relay) in a HetNet state and received by an Rx antenna of another BS.

Among the tree types of interference, the intra-device self-interference (hereinafter referred to as self-interference (SI)) occurs only in the FDR system and it may result in performance degradation in the FDR system. Therefore, the SI is considered as a main problem for efficient operation of the FDR system.

DISCLOSURE OF THE INVENTION

Technical Task

An object of the present invention is to provide a method performed by a device supporting an FDR scheme for self-interference signal cancellation.

Another object of the present invention is to provide a device for not only supporting the FDR scheme but also performing the self-interference signal cancellation.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided herein is a method for performing self-interference signal cancellation, the method performed by a device supporting a full duplex communication (FDR) mode and including: transmitting a signal to a target node in a predetermined time interval; generating and storing a residual self-interference signal after cancelling an analog self-interference signal with respect to the signal at a radio frequency (RF) end of the device; receiving a negative-acknowledgement (NACK) signal from the target node in response to the transmitted signal; retransmitting the signal to the target node; and when a signal received in the predetermined time interval is successfully decoded, using only a portion of the stored residual self-interference signal in cancelling a digital self-interference signal associated with the retransmission. The method may further include obtaining other portions except the portion of the stored residual self-interference signal through self-interference signal estimation associated with the retransmission. In this case, the portion of the stored self-interference signal may include coefficients of linear components in a channel of the stored self-interference signal and coefficients of non-linear components with orders equal to or lower than a predetermined order in the channel of the stored self-interference signal. In addition, the method may further include obtaining coefficients of non-linear components with orders higher than the predetermined order through self-interference signal estimation associated with the retransmission. At this time, the predetermined order may be determined based on transmit power of the signal. Moreover, the method may further include performing digital self-interference cancellation associated with the retransmission using the portion of the stored residual self-interference signal and the portions obtained through the self-interference signal estimation associated with the retransmission.

In another aspect of the present invention, provided herein is a device for supporting a full duplex communication (FDR) mode and performing self-interference signal cancellation, including: a transmitter configured to transmit a signal to a target node in a predetermined time interval; a radio frequency (RF) unit configured to generate and store a residual self-interference signal after cancelling an analog self-interference signal with respect to the signal at an RF end of the device; and a receiver configured to receive a negative-acknowledgement (NACK) signal from the target node in response to the transmitted signal. In this case, the transmitter may be configured to retransmit the signal to the target node. In addition, when a signal received in the predetermined time interval is successfully decoded, the RF unit may be configured to use only a portion of the stored residual self-interference signal in cancelling a digital self-interference signal associated with the retransmission. The device may further include a processor configured to obtain other portions except the portion of the stored residual self-interference signal through self-interference signal estimation associated with the retransmission. In this case, the portion of the stored self-interference signal may include coefficients of linear components in a channel of the stored self-interference signal and coefficients of non-linear components with orders equal to or lower than a predetermined order in the channel of the stored self-interference signal. In addition, the processor may be configured to obtain coefficients of non-linear components with orders higher than the predetermined order through self-interference signal estimation associated with the retransmission. Moreover, the processor may be configured to determine the predetermined order based on transmit power of the signal. Further, the RF unit may be configured to perform digital self-interference cancellation associated with the retransmission using the portion of the stored residual self-interference signal and the portions obtained through the self-interference signal estimation associated with the retransmission.

Advantageous Effects

According to various embodiments of the present invention, self-interference cancellation complexity can be significantly reduced, thereby improving communication performance of the FDR scheme.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
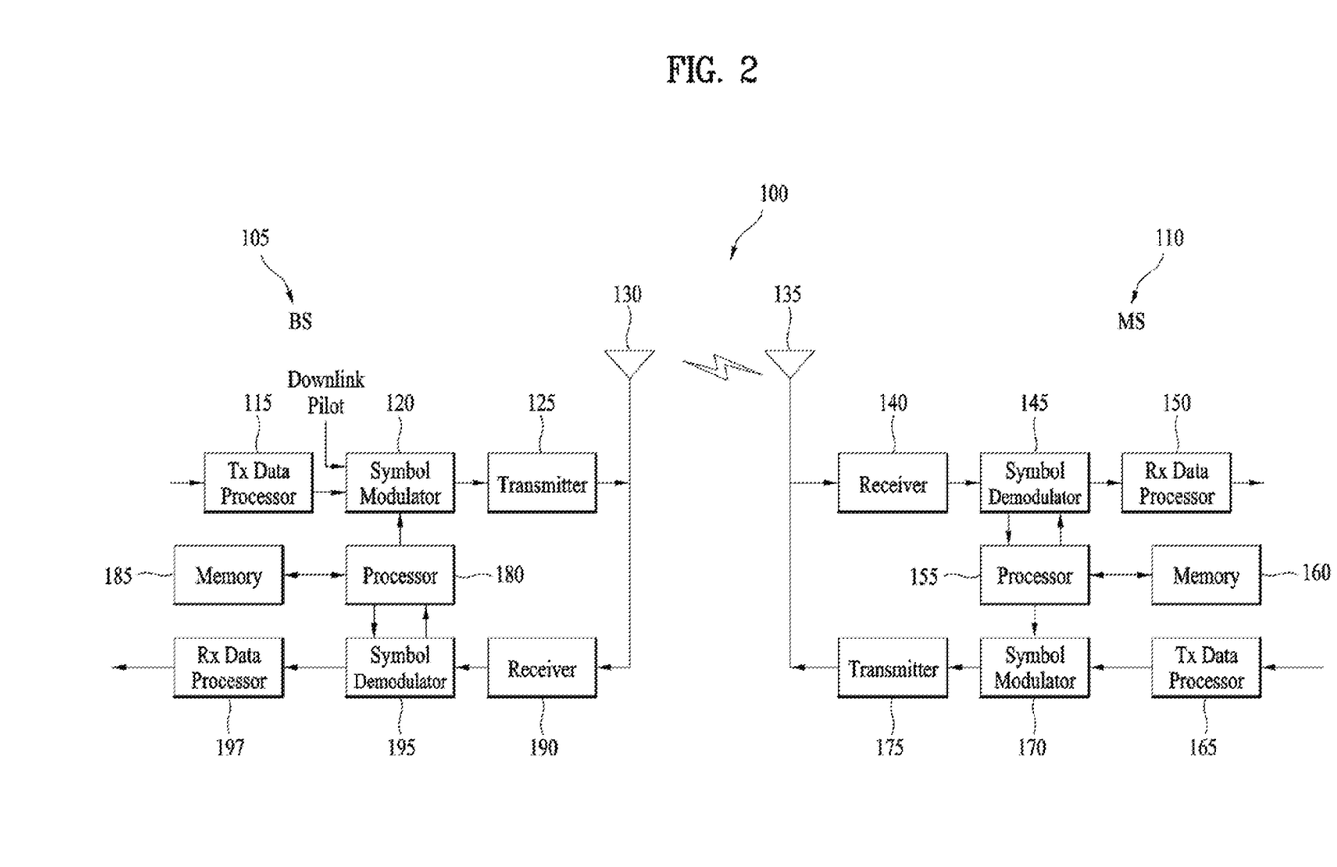
FIG. 2 is a block diagram illustrating configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes an information utilization method for self-interference cancellation (Self-IC) in a full-duplex radio (FDR) system. Particularly, the invention discloses a method of storing information used in previous Self-IC for the purpose of reusing and reprocessing the stored information for current Self-IC. Considering that data to be transmitted is known in the FDR system, it is possible to implement a method of performing Self-IC using existing information such as self-interference (SI) or self-interference channel gain (or self-channel gain) when hybrid automatic repeat request (HARQ) is received. More particularly, the invention proposes a method for obtaining additional information for Self-IC using HARQ indicator (HI) information of both transmitting and receiving ends and determining information used for the Self-IC.

Figure 3:
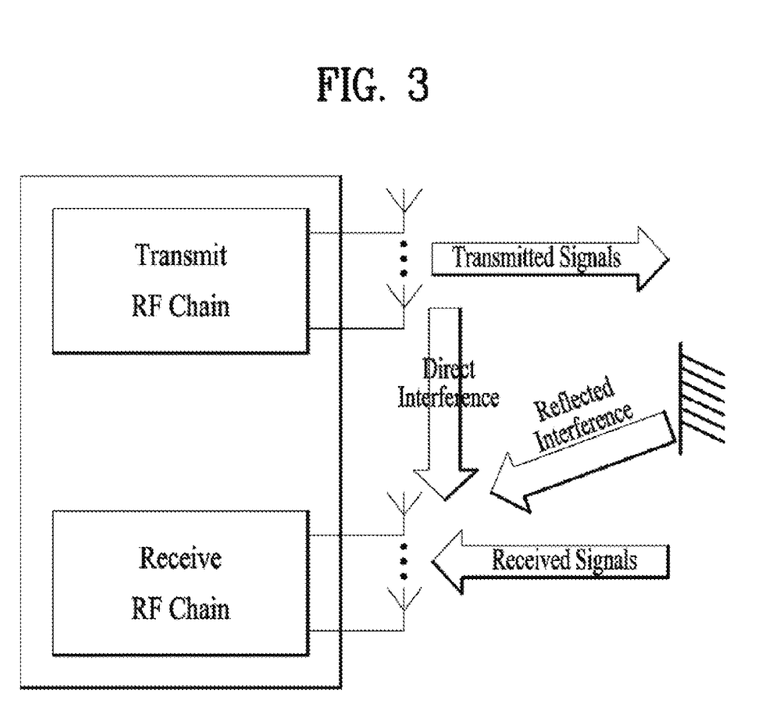
FIG. 3 is a conceptual diagram of self-interference (SI) and Tx/Rx links in an FDR communication environment.

FIG. 3 is a conceptual diagram of self-interference (SI) and Tx/Rx links in an FDR communication environment.

Referring to FIG. 3, the SI can be divided into direct interference, which is caused when a signal transmitted from a transmit (Tx) antenna is received at an Rx antenna of the same device without path attenuation, and reflected interference, which is caused when a signal transmitted from a Tx antenna is reflected on a surrounding object and then received at an Rx antenna of the same device. In addition, the strength of the SI is extremely higher than that of a desired signal due to a physical distance difference. Thus, the SI should be cancelled for efficient operation of the FDR system.

Table 1 shows requirements of the Self-IC in accordance with a maximum Tx power of a device for the efficient operation of the FDR system.

TABLE 1

Self-IC requirements when the FDR is applied to a mobile communication system (BW = 20 MHz)

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed to $N_{0,BW}$=−174 dBm+10×$\log_{10}$ (BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
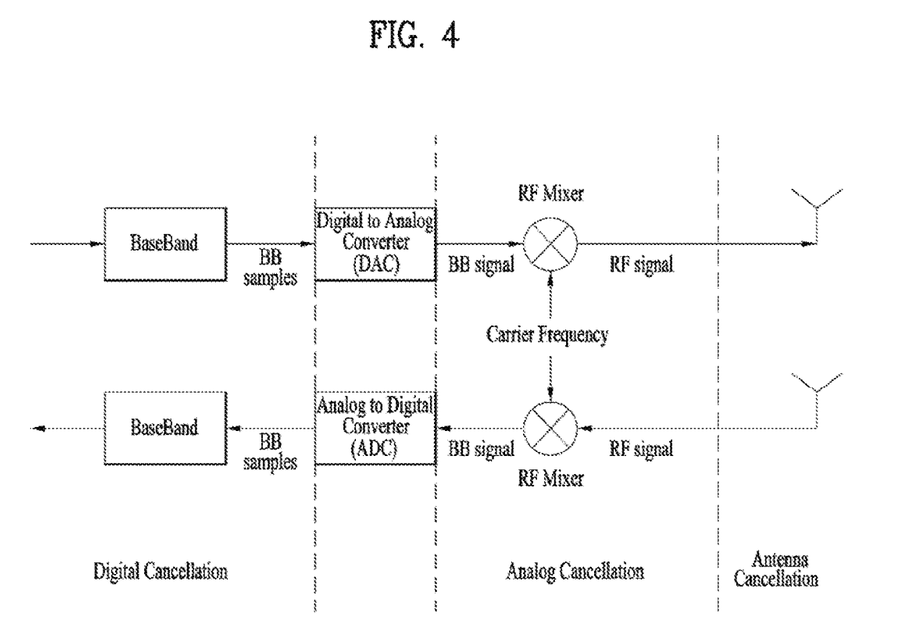
FIG. 4 is a diagram illustrating positions within an RF transceiver (or RF front end) of a device to which three types of interference cancellation schemes are applied.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
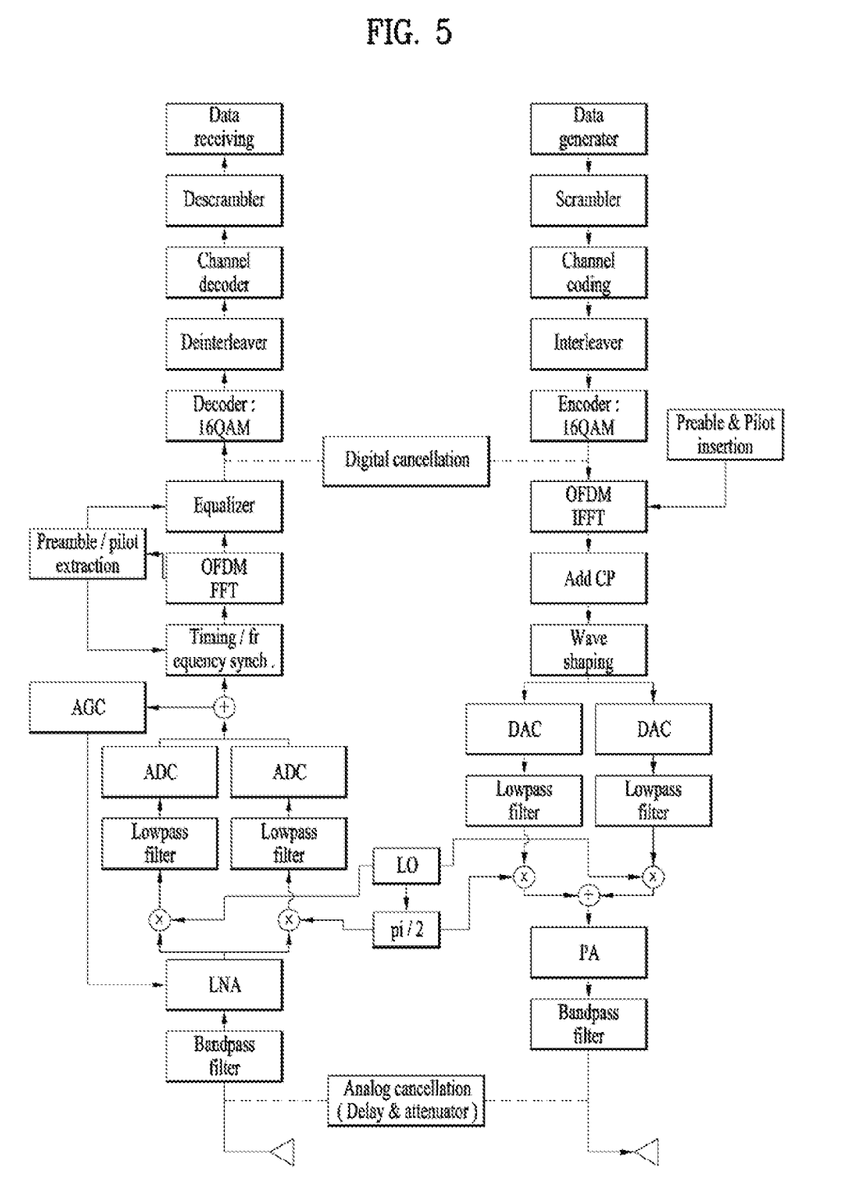
FIG. 5 is a block diagram of a self-interference cancellation (Self-IC) device included in a communication device available in an OFDM-based communication system environment in accordance with FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling in the FDR System

A signal received at a device (e.g., UE, BS, etc.) in the FDR system can be modeled as shown in Equation 1.

$$y[n] = \sum_{k=1,\ldots,K} h_{SI,k}[n] x_{SI}^{k}[n] + h_D[n] x_D[n] + z[n], \quad \text{[Equation 1]}$$

In Equation 1, $x_{SI}[n]$ indicates data transmitted from an RF transmitter of the device, $h_{SI}[n]$ indicates a self-interference channel (self-channel) gain of the data transmitted from the RF transmitter, $x_D[n]$ indicates data that an RF receiver of the device desires to receive, $h_D[n]$ indicates a desired channel gain of the data that the RF receiver desires to receive, and $z[n]$ indicates Additive White Gaussian Noise (AWGN). In this case, k may be considered to have a value of 5 or 7 (i.e., k=5 or 7).

For the above-described analog or digital Self-IC, it is necessary to estimate the self-interference channel (self-channel). In this case, after completion of the Self-IC using a gain of the estimated analog and/or digital self-interference channel, $\hat{h}_{SI,k}[n]$, for k=1, . . . , K, the received signal of the device can be expressed as shown in Equation 2.

$$Y_{Self-IC}[n] = \qquad\qquad\qquad\qquad\qquad \text{[Equation 2]}$$
$$h_D[n]x_D[n] + \underbrace{\sum_{k=1,\ldots,K}\left(h_{SI,k}[n] - \hat{h}_{SI,k}[n]\right)x_{SI}^k[n] + z[n]}_{ResidualSI}.$$

When the received signal is decoded using the estimated gain of the described channel, $\hat{h}_D[n]$, the received signal can be expressed as shown in Equation 3.

$$\frac{\hat{h}_D^*[n]y_{Self-IC}[n]}{|\hat{h}_D[n]|^2} = \frac{\hat{h}_D^*[n]h_D[n]}{|\hat{h}_D[n]|^2}x_D[n] + \frac{\hat{h}_D^*[n]z'[n]}{|\hat{h}_D(t)|^2} \qquad \text{[Equation 3]}$$
$$= x_D[n] + \frac{\hat{h}_D^*[n]e[n]}{|\hat{h}_D[n]|^2} + \frac{\hat{h}_D^*[n]z'[n]}{|\hat{h}_D[n]|^2},$$

In Equation 3,
$$z'[n] = \sum_{k=1,\ldots,K}\left(h_{SI,k}[n] - \hat{h}_{SI,k}[n]\right)x_{SI}^k[n] + z[n] \text{ and}$$
$$e[n] = \hat{h}_D[n] - h_D[n].$$

According to the initial digital self-interference cancellation technique, linear components of the interference signal are modeled for digital self-interference cancellation. In recent years, efforts are made to implement a digital self-interference cancellation technique of using not only linear components of interference signal information but also non-linear components of the interference signal information for feasible operation of the FDR system. As shown in Equation 1, linear and non-linear components of SI information may be determined by transmitted data and an interference channel gain of the transmitted data. Therefore, interference signal information needs to be calculated and updated every transmission. However, if an SI signal including linear and nonlinear components is calculated in real time whenever transmission is performed, it may increase the amount of calculation and complexity. Therefore, a method for reducing the complexity of the digital self-interference cancellation while efficiently operating the system needs to be developed.

Figure 6:
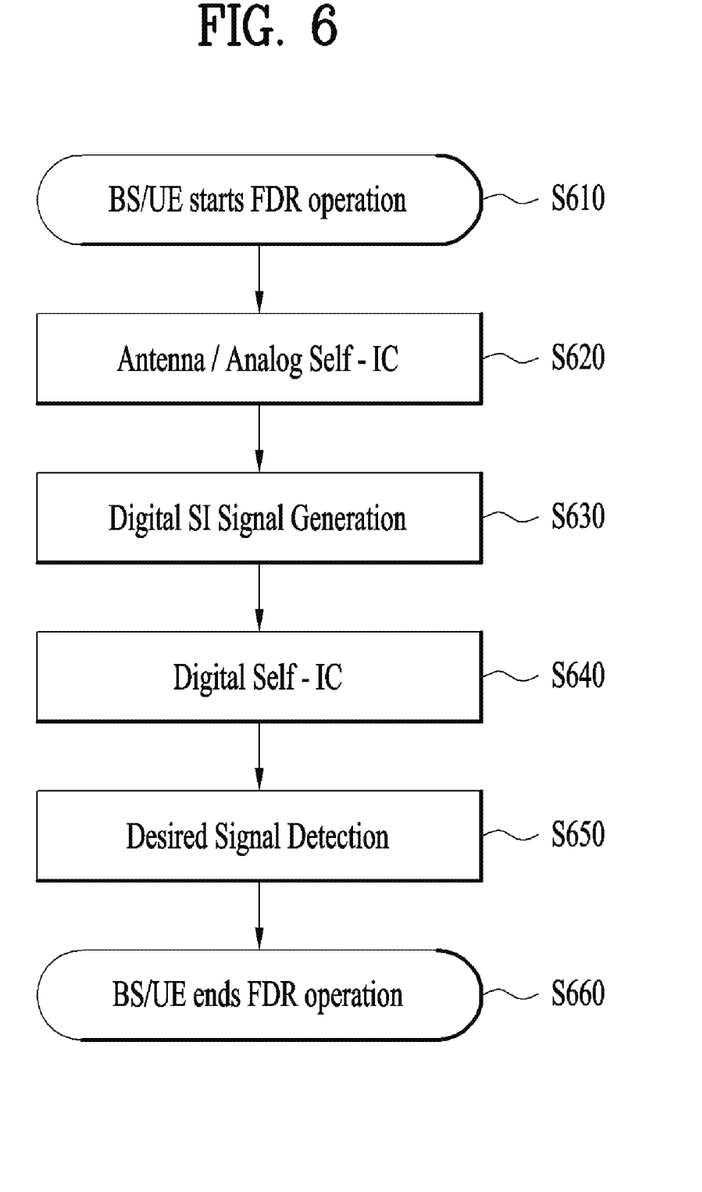
FIG. 6 is a diagram illustrating a procedure for self-interference cancellation performed by devices (e.g., user equipment, base station, etc.) in the FDR system.

FIG. 6 is a diagram illustrating a procedure for self-interference cancellation performed by devices (e.g., user equipment, base station, etc.) in the FDR system.

Referring to FIG. 6, a device initiates FDR operation [S610] and cancels an SI signal using the antenna Self-IC scheme and analog Self-IC scheme [S620]. After cancelling the SI signal by applying the antenna Self-IC scheme and analog Self-IC scheme, the device can obtain the signal of Equation 1, $$y[n] = \sum_{k=1,\ldots,K} h_{SI,k}[n]x_{SI}^k[n] + h_D[n]x_D[n] + z[n],.$$

Next, the device can generate a digital SI signal from the signal of Equation 1 [S630] and then obtain the signal of Equation 2 by performing the digital Self-IC using the generated digital SI signal [S640]. After performing the digital Self-IC on a block which is expected to contain a desired signal (i.e., a desired signal detection block), the device can detect the desired signal shown in Equation 3 through decoding [S650]. After detection of the desired signal, the device can terminate the FDR operation [S660].

Figure 7:
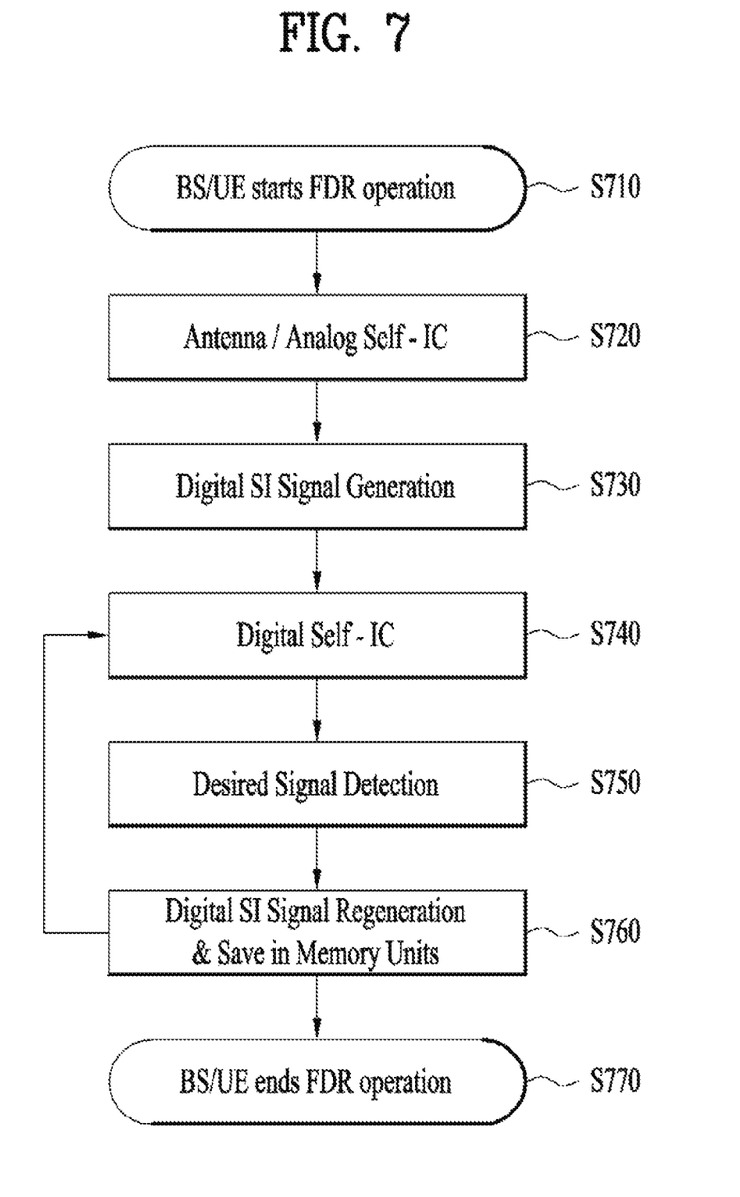
FIG. 7 is a diagram illustrating another procedure for self-interference cancellation (Self-IC) different from that of FIG. 6.

FIG. 7 is a diagram illustrating another procedure for self-interference cancellation (Self-IC) different from that of FIG. 6.

Referring to FIG. 7, steps S710 to S750 are similar to the steps S610 to S650 of FIG. 6. However, the procedure of FIG. 7 is different from that of FIG. 6 in that a block unit for regenerating a digital SI signal and storing the regenerated digital SI signal in a memory unit can be added to an RF chain (or RF end) and used for the Self-IC. In the FDR system, if the same data is retransmitted according to a retransmission request from a UE or BS that currently performs communication, a signal identical to the existing SI signal may be received at an RF receiver as an interference signal. Thus, if the interference signal used in the last or previous digital Self-IC or a reconfigured SI signal is reused, it may reduce or eliminate complexity in generating a new SI signal. That is, before the RF transmitter retransmits the identical signal, the device detects the desired signal that the RF receiver desires to receive [S750]. Thereafter, the device regenerates the digital SI signal and then stores it in the memory unit [S760]. The stored digital SI signal can be used for cancelling interference that occurs when the same data is retransmitted according to the retransmission request.

Meanwhile, signal detection performance significantly depends on accuracy of an estimated SI channel ($\hat{h}_{SI,k}[n]$) and a desired channel (signal) ($\hat{h}_D[n]$). That is, the success or failure of the Self-IC can be determined according to whether the final received signal is successfully detected or not. Table 2 shows a relationship between the success or failure of the Self-IC and the success or failure of detecting the received signal (number of cases according to the success or failure of Self-IC and the success or failure of detecting the received signal).

TABLE 2

|  | Success of Self-IC | Failure of Self-IC |
| --- | --- | --- |
| Success of detecting received signal | Case 1 | None |
| Failure of detecting received signal | Case 2 | Case 3 |

In Table 2, the case 1 is a case in which the device successfully receives the desired signal after completion of the digital Self-IC, the case 2 is a case in which in spite of the successful digital Self-IC, the device fails to detect the received signal due to erroneous estimation of the desired channel or a low-quality link, and the case 3 is a case in which due to the failure of the Self-IC, the device fails to detect the received signal. In case of the failure of the Self-IC, since the strength of the interference signal is extremely higher than that of the received signal, it is determined that the device cannot detect the received signal.

Figure 8:
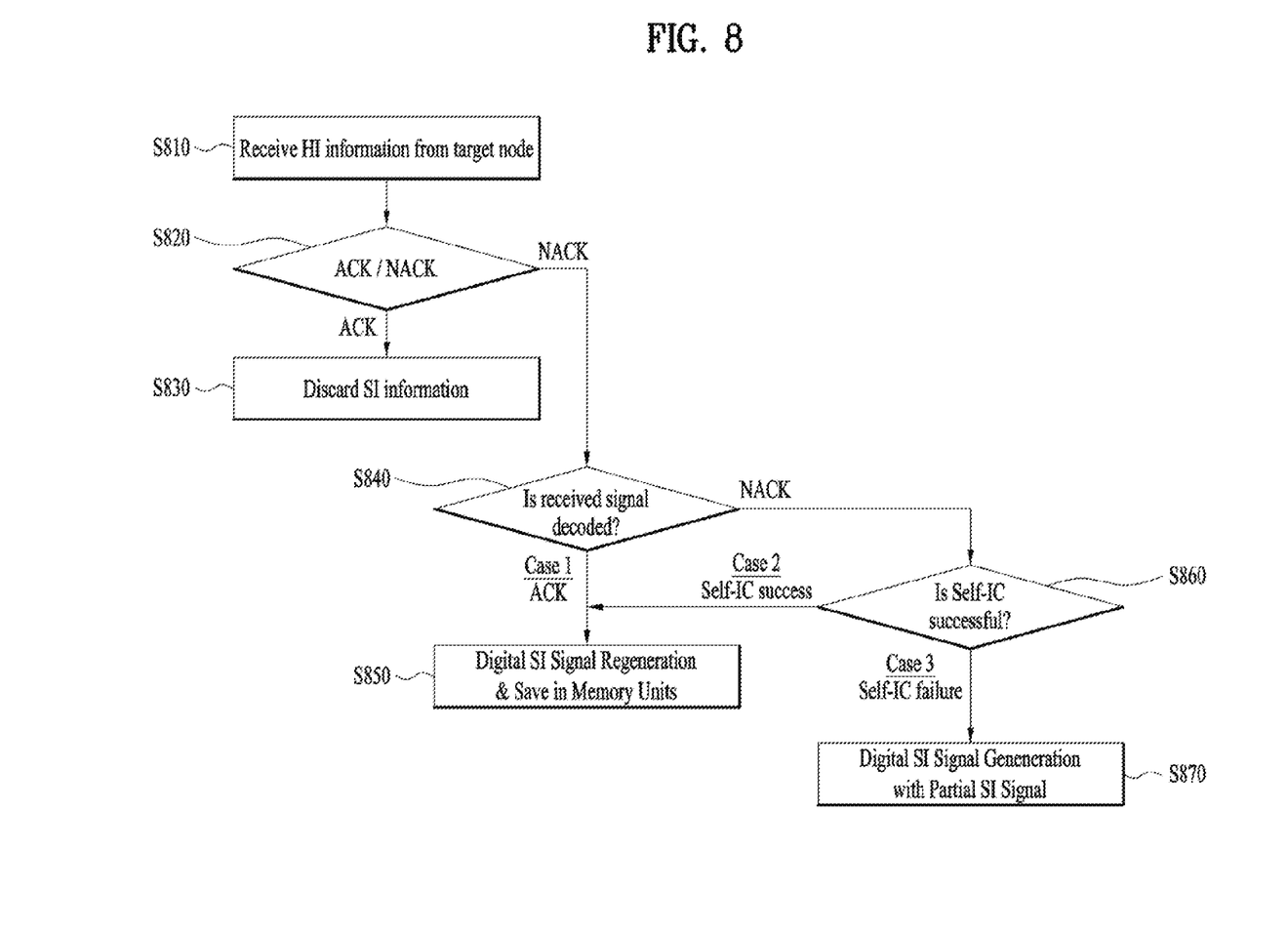
FIG. 8 is a diagram illustrating a particular procedure for regenerating a digital SI signal and storing the digital SI signal in a memory unit based on three cases shown in Table 2.

In FIG. 8, a particular procedure for regenerating a digital SI signal and storing the regenerated digital SI signal in a memory unit based on the above-described three cases.

FIG. 8 is a diagram illustrating a particular procedure for regenerating a digital SI signal and storing the digital SI signal in a memory unit based on the three cases shown in Table 2.

Basically, the success of detecting the received signal is highly related to the success or failure of the Self-IC. In addition, considering that the previous (same) data is transmitted when a target node (e.g., a UE or BS) requests retransmission, a high Self-IC success rate is expected even though variables used in the previous Self-IC are used for the current Self-IC (or the variables used in the previous Self-IC may not be changed or be modified). Therefore, the present invention proposes a method for performing the Self-IC based on ACK/NACK in response to transmitted and received signals.

Figure 9:
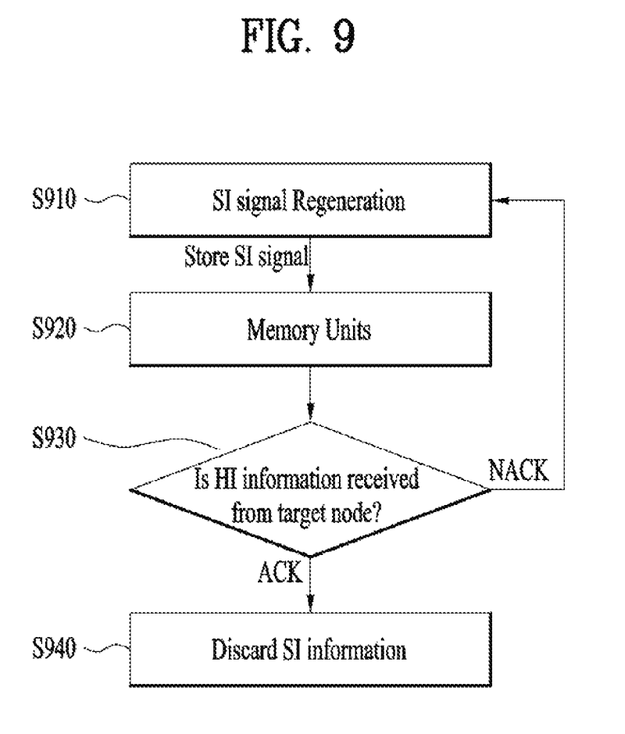
FIG. 9 is a diagram for explaining a procedure for self-interference cancellation proposed in the present invention.

For example, a BS transmits, to a UE, an HARQ indicator (HI) including an ACK/NACK signal in response to a signal transmitted from the UE through a physical hybrid-ARQ indicator channel (PHICH) and the UE receives the HI [S810] (On the other hand, the UE may transmit ACK/NACK information through a physical uplink control channel (PUCCH)). The UE determines whether the HI information received from the BS indicates ACK or NACK [S820]. If it is determined that the HI information indicates the ACK, the UE can discard the previously generated digital SI information with respect to the transmitted signal to which the response is the ACK [S830]. On the other hand, if it is determined that the HI information indicates the NACK, the UE determines whether the previously desired received signal is decoded [S840]. That is, for example, if the UE receives, from the BS, HI information corresponding to a NACK signal in response to a signal transmitted in a subframe n, the UE needs to determine whether a signal received in the subframe n is decoded or not. This corresponds to the case 1 of Table 2. If the received signal is decoded, the UE regenerate the digital SI signal and stores the regenerated digital SI signal in the memory unit [S850]. On the contrary, if the received signal is not decoded, the UE determines whether the Self-IC is successful [S860]. If the Self-IC is successful, this corresponds to the case 2 of Table 2. The UE regenerates the digital SI signal and then stores the regenerated digital SI signal in the memory unit. If the Self-IC is not successful, the UE generates a digital SI signal together with a partial SI signal [S870]. The above-described Self-IC method can be applied to not only a UE but also all wireless communication devices using the FDR mode such as a BS. Moreover, to secure a capacity of the memory, the UE can determine whether to continuously store SI signals as shown in FIG. 9. That is, the UE may determine whether to store the SI signals based on the HI information received from the BS.

FIG. 9 is a diagram for explaining a procedure for self-interference cancellation proposed in the present invention.

Referring to FIG. 9, a device (e.g., UE) regenerate the digital SI signal [S910] and then the regenerated digital SI signal in the memory unit [S920]. Thereafter, the device determines whether HI information received from a target node (e.g., BS) indicates ACK or NACK [S930]. If it is determined that the HI information indicates the ACK, the device discards SI information with respect to the transmitted signal to which the response is the ACK [S940].

Figure 10:
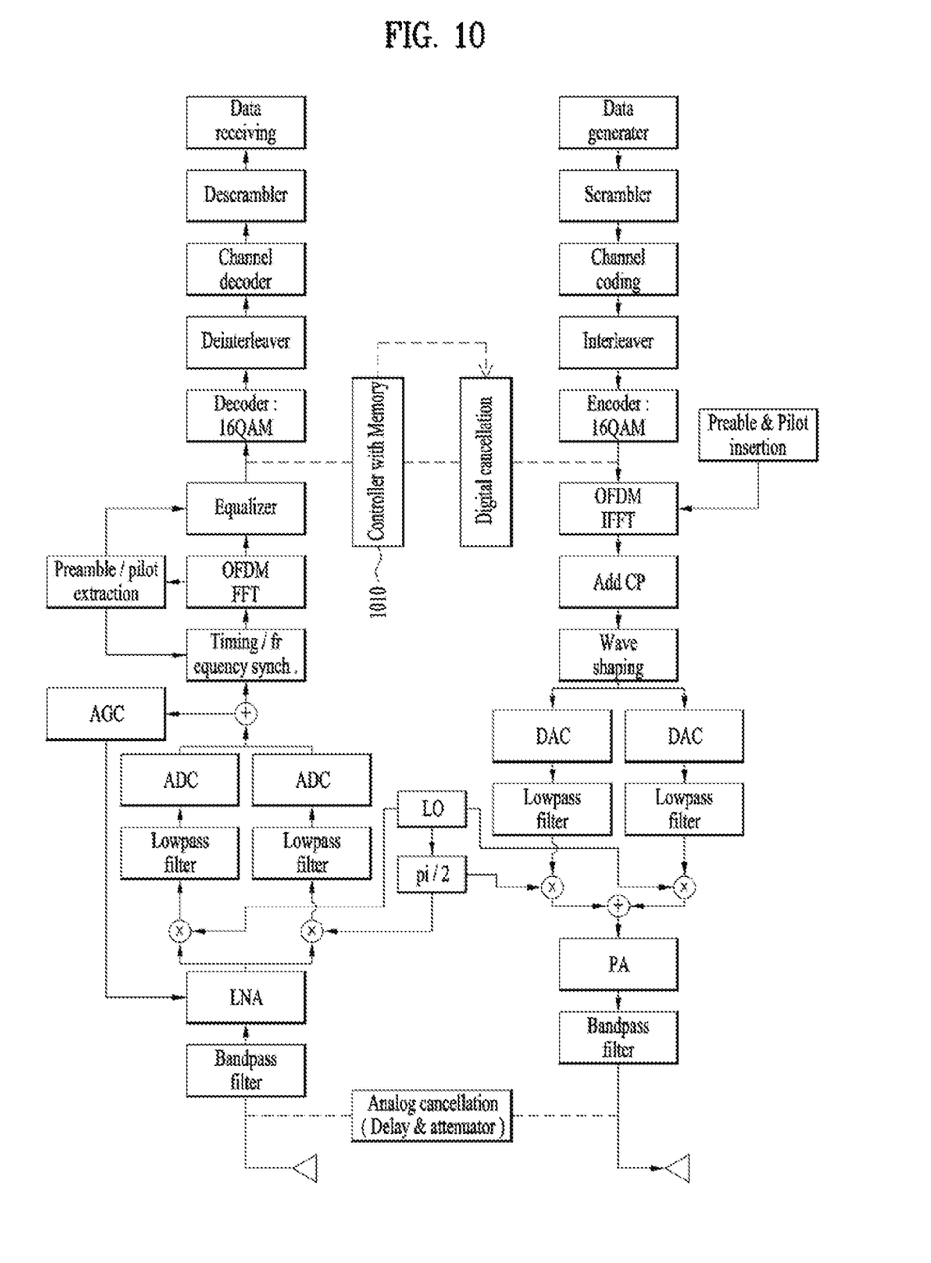
FIG. 10 is a block diagram of a device for performing the proposed method based on FIG. 5.

FIG. 10 is a block diagram of a device for performing the proposed method based on FIG. 5.

To compensate and store an SI signal used for a digital Self-IC scheme, a controller 1010 with a memory block is installed in a cancellation block. Operation of the controller 1010 with the memory block will be described in detail.

Embodiment 1: Method for Storing and Using a Channel Coefficient of a Previously Used SI Signal in the Case of Adaptive HARQ If a device (BS/UE) retransmits the same data according to an adaptive HARQ request, the device (BS/UE) can perform digital Self-IC by reusing previously used SI channel information. According to the embodiment 1 of the present invention, when the BS/UE operating in the FDR mode needs to retransmit the same data due to the adaptive HARQ request, the BS/UE can skip SI channel estimation in the course of creating a new SI signal for the Self-IC and perform the Self-IC using the previously used SI channel information, e.g., $\hat{h}_{SI,k}[n]$, for $k=1, \ldots, K$ because a change in the SI channel gain is relatively small. More specifically, only when the BS/UE successfully decodes a signal received in a subframe n before the retransmission, the BS/UE can use an SI channel in the subframe n, $\hat{h}_{SI,k}[n]$, for $k=1, \ldots, K$ for the Self-IC in the retransmission.

When the previous SI channel is used for the retransmission, signal modeling can be implemented as shown in Equation 4. That is, if the same data is transmitted according to the retransmission request from a target UE/BS, the received signal can be modeled in the FDR system as shown in Equation 4.

$$y[n+n_R] = \sum_{k=1,\ldots,K} h_{SI,k}[n+n_R] x^k_{SI,A-HARQ}[n+n_R] + \quad \text{[Equation 4]}$$

$$h_D[n+n_R] x_D[n+n_R] + n[n+n_R],$$

In Equation 4, $x_{SI,A-HARQ}[n+n_R]$ indicates data retransmitted according to the retransmission request in an adaptive HARQ manner. Since $x_{SI,A-HARQ}[n+n_R]$ is transmitted using a modulation and coding scheme (MCS) level identical to or different from that used for the previously transmitted data and resource blocks (RBs) identical to or different from those used in the previous transmission, $x_{SI,A-HARQ}[n+n_R]$ is different from $x_{SI}[n]$.

As described above, the BS/UE performs the Self-IC on a subframe ($n+n_R$) through a digital Self-IC block by reusing estimated SI channel information $\hat{h}_{SI,k}[n]$, for $k=1, \ldots, K$ used in the subframe n through the digital Self-IC block. In this case, a received signal passing through the digital Self-IC step can be expressed as shown in Equation 5.

$$Y_{Self-ID}[n+n_R] = \sum_{k=1,\ldots,K} h_{SI,k}[n+n_R] x^k_{SI,A-HARQ}[n+n_R] - \quad \text{[Equation 5]}$$

$$SI_I[n] + h_D[n+n_R] x_D[n+n_R] + n[n+n_R], =$$

$$h_D[n+n_R] x_D[n+n_R] +$$

$$\underbrace{\sum_{k=1,\ldots,K} (h_{SI,k}[n+n_R] - h_{SI,k}[n]) x^k_{SI,A-HARQ}[n+n_R]}_{ResidualSI} +$$

$$n[n+n_R].$$

It can be seen from Equation 5 that a residual SI signal has a value different from that of the previous residual signal in Equations 2 and 5. However, in the environment in which the SI channel is not or slightly changed depending on time, since a difference between $$\sum_{k=1,\ldots,K} h_{SI,k}[n+n_R]x^k_{SI,NA-HARQ}[n+n_R] \text{ and}$$

$$\sum_{k=1,\ldots,K} h_{SI,k}[n]x^k_{SI}[n]$$

is small enough to be handled by the digital Self-IC, the successful previous Self-IC results can be reused through the digital SI information (e.g., a value used for the digital Self-IC as a residual SI signal after analog Self-IC) stored in a memory, thereby achieving excellent Self-IC performance in the case of the retransmission.

In addition, according to a sub-embodiment (embodiment 1-1) of the embodiment 1, it is proposed that when the BS/UE operating in the FDR mode intends to perform the retransmission, the BS/UE performs the retransmission based on the adaptive HARQ using the MCS level and RBs identical to or different from those used in the previous transmission and reception based on chase combining for above-mentioned reasons.

Moreover, according to another sub-embodiment (embodiment 1-2) of the embodiment 1, it is proposed that when the BS/UE operating in the FDR mode intends to perform the retransmission, the BS/UE can store analog/digital channel gain information in the memory in each or all of the 8 subframes for above-mentioned reasons.

In the case 2 of Table 2, a device fails to decode a received signal in spite of successful Self-IC. In general, if the device fails to decode the received signal, the device cannot know whether the Self-IC is successful or not because the device cannot know which steps in the decoding and Self-IC processes are problematic. However, in this case, the SI signal can be reused as follows.

Embodiment 2: Method for Storing and Reusing Low-order Channel Coefficients Among Channel Coefficients of the SI Signal and Re-estimating High-order Channel Coefficients to Reduce Complexity in the SI Channel Estimation and Cancellation According to the embodiment 2, it is proposed to modify the SI signal by reusing low-order portions of linear and non-linear components of the SI signal and re-create high-order portions in the case of the retransmission according to the HARQ request.

In general, estimation accuracy for linear components and low-order non-linear components of an SI signal is high. However, a device may fail Self-IC due to a residual SI signal that occurs when the device fails to estimate high-order non-linear components. Thus, the device can store reusable portion of the SI signal information used for signal transmission in the subframe n and use part of the SI signal in the subframe (n+$n_R$) instead of estimating the entirety of the SI signal in order to estimate the SI signal. The entirety of the SI signal estimated in the subframe (n+$n_R$) can be expressed as shown in Equation 6.

$$SI_4[n+n_R] = \underbrace{\sum_{k=1,\ldots,K_1} h_{SI,k}[n+n_R]x^k_{SI}[n] +}_{\text{Part of SI signal in subframe } n}$$

$$\underbrace{\sum_{k=K_1+1,\ldots,K} h_{SI,k}[n+n_R]x^k_{SI}[n+n_R]}_{\text{Newly esitmated SI signal in subframe } (n+nR)}$$

[Equation 6]

In Equation 6, $K_1$ is an integer value for reusing a $K_1^{th}$-order non-liner component including linear components of the SI information used for transmitting the subframe n and $K_1$ can be variously selected according to the environment. For example, the order that should be considered may be changed by an increase or decrease in Tx power. That is, if the Tx power is increased, the order that should be considered may be increased. On the contrary, if the Tx power is decreased, the order which has been considered may not need to be considered anymore. As an extreme example, since a first-order component corresponding to the linear component may not be changed, it can be reused. However, other remaining components need to be additionally estimated due to the change in the Tx power.

If it is determined that the signal received in the subframe n is successfully decode or the Self-IC is successful, it is possible to reuse part of the information used in this case for digital Self-IC in a subframe (n+1). By doing so, complexity in generating the digital SI signal can be reduced, thereby reducing Self-IC overhead.

Embodiment 3: Method for Storing and Reusing Low-order Channel Coefficients Among Channel Coefficients of the SI Signal and Re-estimating High-order Channel Coefficients in Order for the BS/UE to Operate in Always on Mode It is proposed to reuse the previously used information for components with low SI channel gain coefficients among the linear and non-linear components of the SI signal and newly estimate information for components with high SI channel gain coefficients. Generally, since the linear components and low-order non-linear components of the SI signal has high estimation accuracy and are stable, they can be reused for the digital self-IC associated with the retransmission. The SI signal in the subframe (n+1) can be expressed as shown in Equation 7.

$$SI_5[n+1] = \underbrace{\sum_{k=1,\ldots,K_2} h_{SI,k}[n] x^k_{SI}[n+1] +}_{\text{Partial SI channel gain in subframe } n}$$

$$\underbrace{\sum_{k=K_2+1,\ldots,K} h_{SI,k}[n+1]x^k_{SI}[n+1]}_{\text{Newly estimated SI signal in subframe } (n+1)},$$

[Equation 7]

In Equation 7, $K_2$ is an integer value for reusing a channel gain of a $K_2^{th}$-order non-liner component including linear components of the SI information used for transmitting the subframe n and $K_2$ can be variously selected according to the environment.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

A device capable of supporting an FDR scheme and performing self-interference signal cancellation according to the present invention can be industrially applied to various wireless communication systems including the 3GPP LTE/LTE-A system.

What is claimed is:

1. A method for performing self-interference signal cancellation by an apparatus operating in a full duplex communication (FDR) mode, the method comprising:
   transmitting a signal to a target node in a predetermined time duration;
   generating and storing a digital self-interference signal after analog self-interference signal cancellation with respect to the transmitted signal at a radio frequency (RF) end of the apparatus;
   receiving a negative-acknowledgement (NACK) signal from the target node in response to the transmitted signal;
   retransmitting the signal to the target node;
   when a desired signal received in the predetermined time duration from the target node is not successfully decoded and the self-interference signal cancellation is successful, using a portion of the stored digital self-interference signal for the self-interference signal cancellation for the retransmitted signal; and
   when the desired signal received in the predetermined time duration from the target node is not successfully decoded and the self-interference signal cancellation is not successful, reusing the stored digital self-interference signal for the self-interference signal cancellation for the retransmitted signal,
   wherein the portion of the stored digital self-interference signal corresponds to components up to a predetermined order of the components of the stored digital self-interference signal.

2. The method of claim 1, further comprising:
   obtaining other portions except the portion of the stored digital self-interference signal through self-interference signal estimation for the retransmitted signal.

3. The method of claim 1, wherein the components up to predefined order of the components of the stored digital self-interference signal include linear components and non-linear components of orders equal to or lower than the predetermined order of the stored digital self-interference signal.

4. The method of claim 3, further comprising:
   obtaining non-linear components of orders higher than the predetermined order through self-interference signal estimation for the retransmitted signal.

5. The method of claim 1, wherein the predetermined order is determined based on transmit power of the transmitted signal.

6. An apparatus for performing self-interference signal cancellation, the apparatus supporting a full duplex communication (FDR) mode, the apparatus comprising:
   a processor;
   a transmitter configured to transmit a signal to a target node in a predetermined time duration;
   a radio frequency (RF) chain configured to generate and store a digital self-interference signal after an analog self-interference signal cancellation with respect to the transmitted signal at an RF chain of the apparatus; and
   a receiver configured to receive a negative-acknowledgement (NACK) signal from the target node in response to the transmitted signal,
   wherein the transmitter is configured to retransmit the signal to the target node,
   wherein, when a desired signal received in the predetermined time duration from the target node is not successfully decoded and the self-interference signal cancellation is successful, the processor is configured to use a portion of the stored digital self-interference signal for the self-interference signal cancellation for the retransmitted signal;
   when the desired signal received in the predetermined time duration from the target node is not successfully decoded and the self-interference signal cancellation is not successful, the processor is configured to reuse the stored digital self-interference signal for the self-interference signal cancellation for the retransmitted signal, and
   wherein the portion of the stored digital self-interference signal corresponds to components up to a predetermined order of the components of the stored digital self-interference signal.

7. The apparatus of claim 6, further comprising:
   a processor configured to obtain other portions except the portion of the stored digital self-interference signal through self-interference signal estimation for the retransmitted signal.

8. The apparatus of claim 6, wherein the components up to predefined order of the components of the stored digital self-interference signal include linear components and non-linear components of orders equal to or lower than the predetermined order of the stored digital self-interference signal.

9. The apparatus of claim 8,
   wherein the processor is configured to obtain non-linear components of orders higher than the predetermined order through self-interference signal estimation for the retransmitted signal.

10. The apparatus of claim 8, further comprising:
    a processor configured to determine the predetermined order based on transmit power of the transmitted signal.

* * * * *